United States Patent
Ikeda et al.

(10) Patent No.: US 6,731,816 B2
(45) Date of Patent: May 4, 2004

(54) IMAGE PROCESSING APPARATUS

(75) Inventors: Shingo Ikeda, Tama (JP); Katsumi Karasawa, Kawasaki (JP); Hidenori Hoshi, Kawasaki (JP); Akihiro Oishi, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,530

(22) Filed: Sep. 6, 2001

(65) Prior Publication Data

US 2002/0031273 A1 Mar. 14, 2002

Related U.S. Application Data

(62) Division of application No. 08/714,500, filed on Sep. 16, 1996, now Pat. No. 6,301,390, which is a continuation of application No. 08/220,167, filed on Mar. 30, 1994, now abandoned.

(30) Foreign Application Priority Data

| Mar. 31, 1993 | (JP) | 5-096863 |
| Mar. 31, 1993 | (JP) | 5-096864 |
| May 31, 1993 | (JP) | 5-152980 |
| Aug. 26, 1993 | (JP) | 5-211854 |

(51) Int. Cl.[7] .............................. G06K 9/36
(52) U.S. Cl. ................................... 382/248
(58) Field of Search ............... 382/232, 293, 382/296, 297, 239, 243; 348/397, 399, 411, 420, 421, 408; 375/240, 240.01, 240.5, 240.24

(56) References Cited

U.S. PATENT DOCUMENTS

| 4,545,069 | A |   | 10/1985 | Kermisch | 382/297 |
| 4,764,805 | A | * | 8/1988 | Rabbani et al. | 375/240.01 |
| 4,774,562 | A | * | 9/1988 | Chen et al. | 375/240.01 |
| 4,868,653 | A | * | 9/1989 | Golin et al. | 375/240.23 |
| 4,920,426 | A |   | 4/1990 | Hatori et al. | 382/239 |
| 4,956,872 | A |   | 9/1990 | Kimura | 382/283 |
| 4,972,260 | A |   | 11/1990 | Fujikawa et al. | 375/240.03 |
| 5,063,608 | A |   | 11/1991 | Siegel | 382/239 |
| 5,101,280 | A |   | 3/1992 | Moronaga et al. | 382/239 |
| 5,117,287 | A |   | 5/1992 | Koike et al. | 348/402.1 |
| 5,121,216 | A |   | 6/1992 | Chen et al. |  |
| 5,136,371 | A | * | 8/1992 | Savatier et al. | 375/240.05 |
| 5,301,018 | A | * | 4/1994 | Smidth et al. | 375/240.24 |
| 5,301,242 | A |   | 4/1994 | Gonzales et al. | 382/239 |
| 5,327,502 | A |   | 7/1994 | Katata et al. | 382/239 |
| 5,392,362 | A |   | 2/1995 | Kimura et al. | 382/176 |
| 5,402,146 | A |   | 3/1995 | Rodriguez et al. | 348/400.1 |
| 5,459,490 | A |   | 10/1995 | Miyake | 345/547 |
| 5,517,581 | A |   | 5/1996 | Johnston et al. | 382/232 |
| 5,563,960 | A |   | 10/1996 | Shapiro | 382/239 |
| 5,588,075 | A |   | 12/1996 | Chiba et al. | 382/239 |

FOREIGN PATENT DOCUMENTS

| JP | 02-056187 |   | 2/1990 | H04N/7/13 |
| JP | 05-252499 | A | 9/1993 | H04N/7/133 |
| JP | 06-303588 | A | 10/1994 | H04N/7/13 |

* cited by examiner

*Primary Examiner*—Andrew W. Johns
*Assistant Examiner*—Shervin Nakhjavan
(74) *Attorney, Agent, or Firm*—Fitzpatrick, Cella, Harper & Scinto

(57) ABSTRACT

An image processing apparatus in which an image signal is divided into blocks each comprising a plurality of pixels and a quantization and a variable length encoding are executed so that a code amount of a plurality of blocks lies within a certain range. As a plurality of blocks, the position of the block which is selected at the nth order approaches the periphery of a picture screen with an increase in value of (n).

7 Claims, 20 Drawing Sheets

FIG. 1A

|       | i=1 | i=2 | i=3 | ---------- | i=n |
|-------|-----|-----|-----|------------|-----|
| j=1   |     |     |     |            |     |
| j=2   |     |     |     |            |     |
| j=3   |     |     |     |            |     |
| ⋮     |     |     |     |            |     |
| j=m   |     |     |     |            |     |

FIG. 1B

| k=1 | k=2 | k=3 | ----- | ----- | ----- |
|-----|-----|-----|-------|-------|-------|
| ----- | ----- | ----- | ----- | ----- | ----- |
| ----- | ----- | ----- | ----- | ----- | k=l |

FIG. 3A

FIG. 3B $N = \frac{n}{2}$ (n IS AN EVEN NUMBER)

$N = \frac{n}{2}$ (n IS AN ODD NUMBER)

FIG. 6
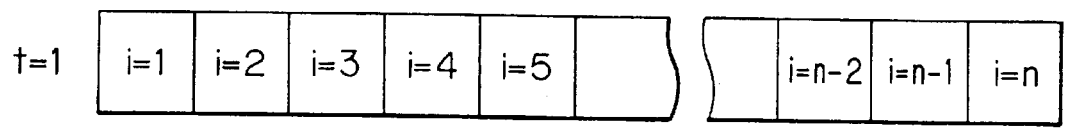
t=1
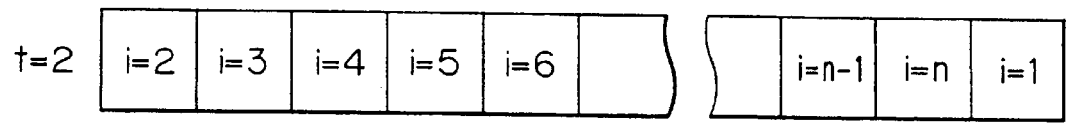
t=2
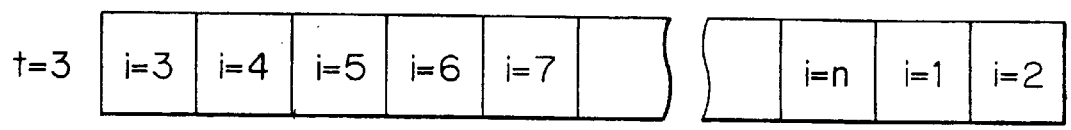
t=3

FIG. 7

| | A | B | C | D | E |
|---|---|---|---|---|---|
| 1 | A1 | B5 | C9 | D3 | E7 |
| 2 | A2 | B6 | C10 | D4 | E8 |
| 3 | A3 | B7 | C1 | D5 | E9 |
| 4 | A4 | B8 | C2 | D6 | E10 |
| 5 | A5 | B9 | C3 | D7 | E1 |
| 6 | A6 | B10 | C4 | D8 | E2 |
| 7 | A7 | B1 | C5 | D9 | E3 |
| 8 | A8 | B2 | C6 | D10 | E4 |
| 9 | A9 | B3 | C7 | D1 | E5 |
| 10 | A10 | B4 | C8 | D2 | E6 |

DIVIDED BLOCK

PICTURE SCREEN

ERROR OCCURS

FIG. 15

ENCODING ORDER →

| B1(n) | C1(n) | E1(n) | D1(n) | A1(n) |
|---|---|---|---|---|
| C2(n) | E2(n) | B2(n) | D2(n) | A2(n) |
| C3(n) | E3(n) | B3(n) | A3(n) | D3(n) |
| C4(n) | A4(n) | D4(n) | E4(n) | B4(n) |
| C5(n) | A5(n) | D5(n) | B5(n) | E5(n) |
| D6(n) | C6(n) | A6(n) | B6(n) | E6(n) |
| D7(n) | B7(n) | C7(n) | A7(n) | E7(n) |
| D8(n) | B8(n) | C8(n) | A8(n) | E8(n) |
| B9(n) | D9(n) | C9(n) | E9(n) | A9(n) |
| B10(n) | D10(n) | C10(n) | E10(n) | A10(n) |

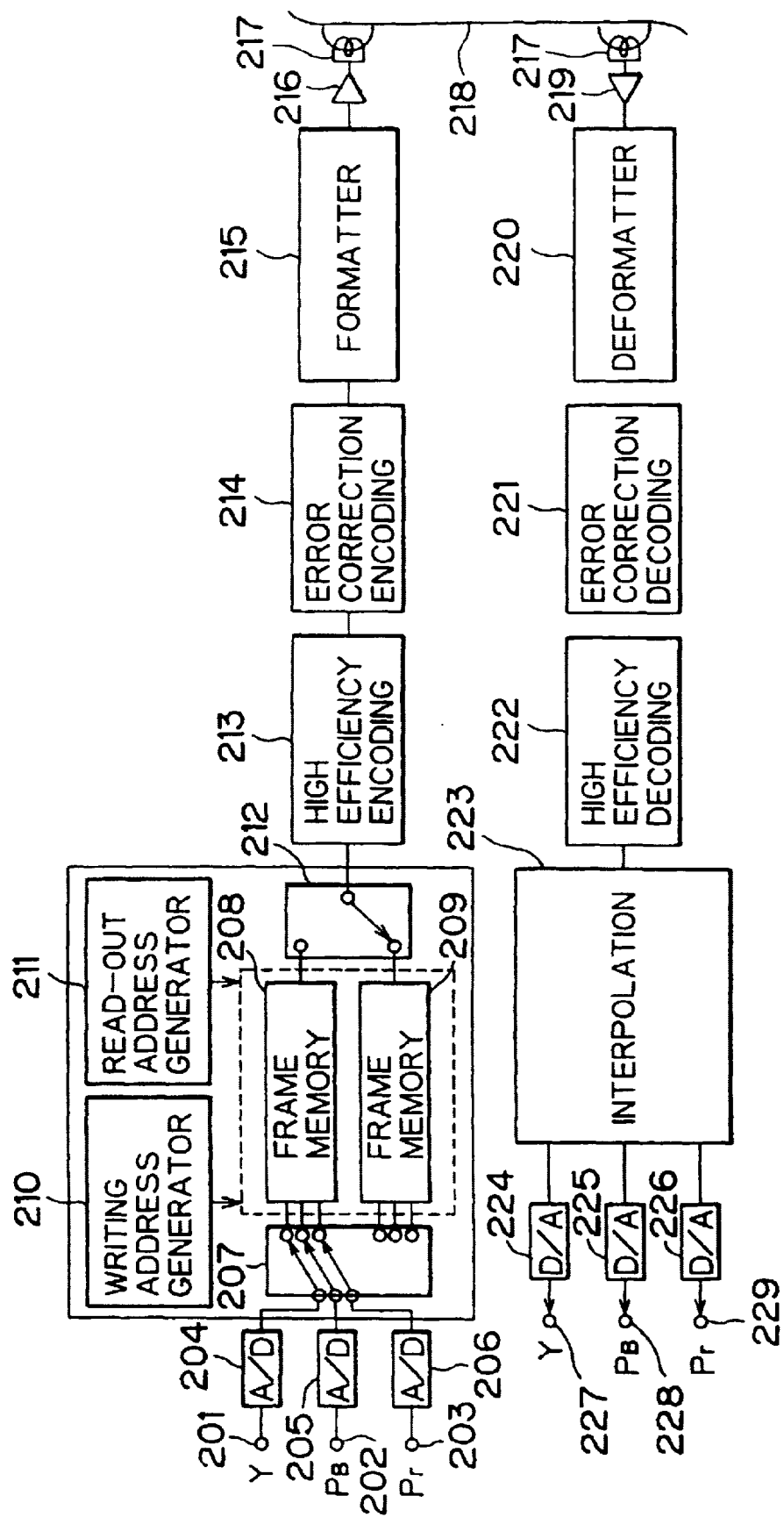

FIG. 22A

| | | 0 | 1 | 2 | | 21 | 22 |
|---|---|---|---|---|---|---|---|
| | 0 | A | B | A | | B | A |
| | 1 | B | A | B | | A | |
| 0 | 2 | A | B | A | | B | B |
| | 3 | B | A | B | | A | |
| | 4 | A | B | A | | B | A |
| | 5 | B | A | B | | A | |
| | 0 | A | B | A | | B | B |
| | 1 | B | A | B | | A | |
| 1 | 2 | A | B | A | | B | A |
| | 3 | B | A | B | | A | |
| | 4 | A | B | A | | B | B |
| | 5 | B | A | B | | A | |

FIRST FRAME

FIG. 22B

| | | 0 | 1 | 2 | | 21 | 22 |
|---|---|---|---|---|---|---|---|
| | 0 | B | A | B | | A | B |
| | 1 | A | B | A | | B | |
| 0 | 2 | B | A | B | | A | A |
| | 3 | A | B | A | | B | |
| | 4 | B | A | B | | A | B |
| | 5 | A | B | A | | B | |
| | 0 | B | A | B | | A | A |
| | 1 | A | B | A | | B | |
| 1 | 2 | B | A | B | | A | B |
| | 3 | A | B | A | | B | |
| | 4 | B | A | B | | A | A |
| | 5 | A | B | A | | B | |

SECOND FRAME

IMAGE PROCESSING APPARATUS

This application is a division of application Ser. No. 08/714,500 filed on Sep, 16, 1996, now U.S. Pat. No. 6,301,390 which is a continuation of application Ser. No. 08/220,167 filed on Mar. 30, 1994, now abandoned.

BACKGROUND OF THE INVENTION

1. Field of the Invention

The present invention relates to an image processing apparatus and, more particularly, to an image processing apparatus in which an analog-digital converted image signal is compressed and transmitted through a transmission medium or recording medium and, after that, the data is expanded and is digital-analog converted, and the image signal is generated.

2. Related Background Art

There is considered an image processing apparatus in which an image signal is divided into blocks each comprising a plurality of blocks and the data is orthogonal converted and the orthogonal converted data is quantized and variable length encoded so as to obtain a code amount in a certain range in said plurality of blocks.

As a method of selecting the plurality of blocks in such an image processing apparatus, a method as shown in FIGS. 1A and 1B is considered. FIG. 1A shows a whole image which is divided into (i=1 to n) blocks in the lateral direction and (j=1 to m) blocks in the vertical direction. Further, FIG. 1B shows one of the blocks divided in FIG. 1A and each block is further divided into (k=1 to l) blocks.

In the conventional image processing apparatus, the image signal is divided into blocks which is subjected to the orthogonal conversion as mentioned above. FIG. 2 shows a method of selecting (x) blocks in the case where the number of blocks is equal to x (x is an integer times as large as n) and they are x-block fixed length encoded.

In this instance, the value of (i) in FIG. 1A is sequentially increased from 1 to (n) and the value of (j) is properly changed within an x-block fixed length encoding. The value of (k) can be set to either the same value or different value.

For example, FIG. 3A shows a method of selecting every block when x=2n. FIG. 3B shows a method when x=4n. In FIGS. 3A and 3B, (t) indicates a time and the next block when t=1 is selected assumes t=2.

The image processing apparatus is constructed so as to select the block of the x-block fixed length encoding as mentioned above.

In the above conventional image processing apparatus, however, the Xth block in the x blocks which is subjected to the x-block fixed length encoding has a correlation for the horizontal direction of the image.

In the case where an error occurs in the Xth block in the x blocks, the blocks after the Xth block cannot be decoded and there are characteristics such that an error amount increases as the block approaches the end of the x-block fixed length encoding.

From the above description, there is a drawback such that the number of errors which occur gradually increases for the horizontal direction of the image and it becomes visually unsightly.

SUMMARY OF THE INVENTION

It is an object of the present invention to make it inconspicuous on a decoded image on a screen even if an error occurs during the image process in consideration of the above problems.

According to an embodiment of the invention, there is provided an image processing apparatus in which an image signal is divided into blocks each comprising a plurality of pixels and a quantization and a variable length encoding are executed so that a code amount of the plurality of blocks lies within a certain range, wherein the position of the block which is selected at the nth order among the plurality of blocks approaches to the periphery of the screen as the value of (n) increases.

Since the image processing apparatus of the embodiment is constructed by the above technical means, when the x-block fixed length encoding is performed, the block near the periphery of the screen is selected as an Xth block with an increase in value of (X). Therefore, even when an error occurs during the image process, the location of the error upon decoding relatively approaches the periphery of the image, so that the error is visually inconspicuous.

According to another embodiment of the invention, there is provided an image processing apparatus in which an image signal is divided into blocks each comprising a plurality of pixels and data of the plurality of divided blocks is orthogonal converted and the orthogonal converted data is quantized and variable length encoded so as to obtain a code amount in a certain range by a plurality of blocks, wherein those plurality of blocks don't have any correlation in the vertical and horizontal directions of the image.

According to still another embodiment of the invention, when the above blocks are selected, by rotating the position to start the selection, the position of the block which is selected at the nth order in each of the plurality of blocks doesn't have any correlation in the vertical and horizontal directions of the image.

Since the image processing apparatus of the embodiment is constructed by the above technical means, when the x-block fixed length encoding is performed, by selecting the Xth block so as not to have any correlation for the horizontal direction of the image, even if an error occurs during the image process, the location of the error is not concentrated to a predetermined portion for the horizontal direction of the image upon decoding.

Other objects and advantages of the present invention will become apparent from the following detailed description when taken in conjunction with the appended claims and the accompanying drawings.

BRIEF DESCRIPTION OF THE DRAWINGS

FIGS. 1A and 1B are diagrams showing block divisions of an image;

Figures 3A, 3B:
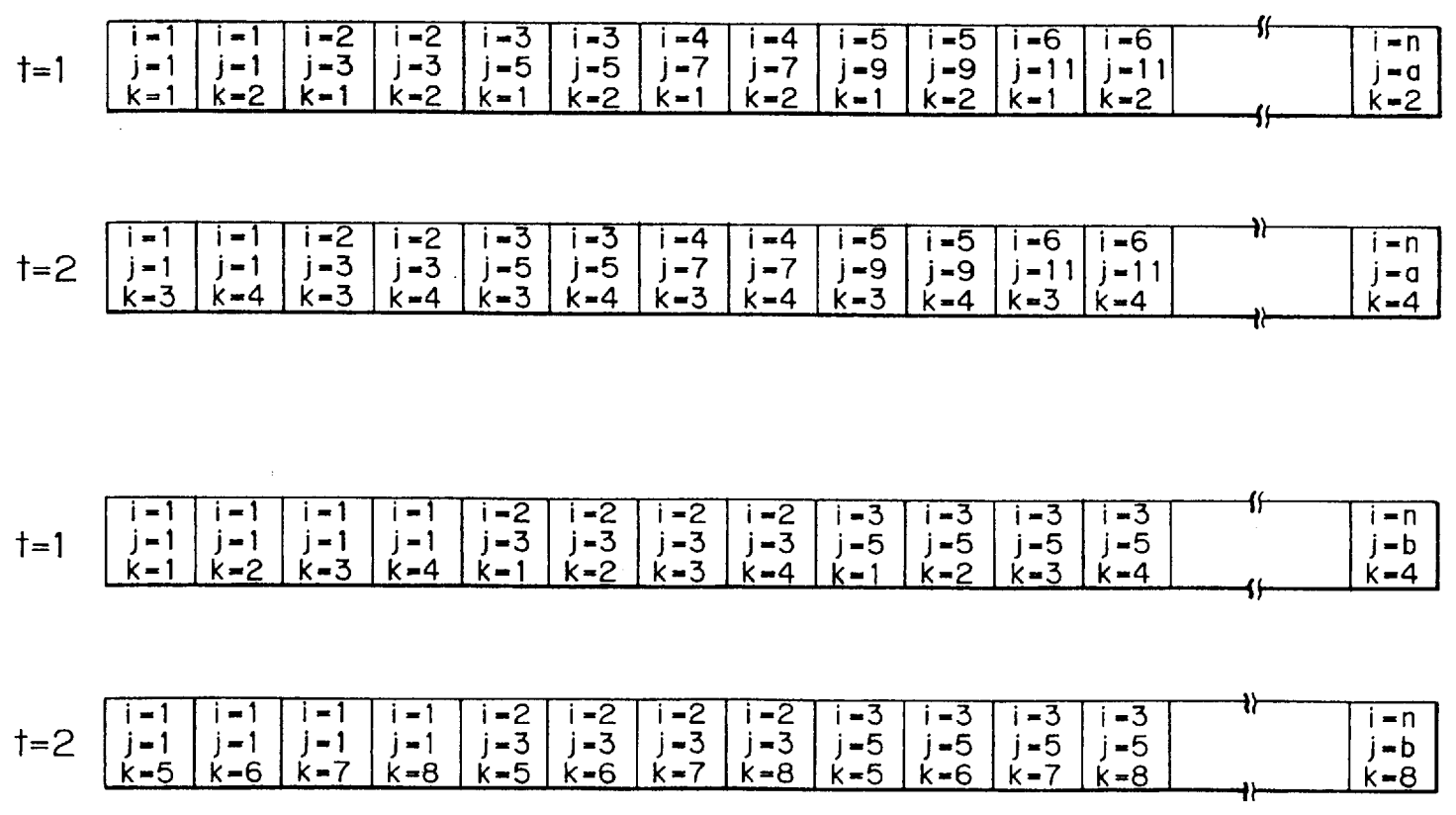

FIGS. 3A and 3B are diagrams showing a block selecting method of an x-block fixed length encoding which is executed in the conventional image processing apparatus;

FIG. 6 is a diagram showing another embodiment of a block selecting method of the x-block fixed length encoding which is executed in the image processing apparatus of FIG. 4;

FIG. 7 is a diagram showing an arrangement of divided blocks on a screen in a conventional apparatus;

FIG. 15 is a diagram showing an example of a construction of fixed length encoding blocks according to the embodiment;

FIG. 17 is a block diagram showing an example of a schematic construction of an image transmitting and receiving system of a digital VTR;

FIGS. 22A and 22B are picture screen image diagrams of two tracks to which the invention is embodied.

DETAILED DESCRIPTION OF THE PREFERRED EMBODIMENTS

An embodiment of an image processing apparatus of the present invention will now be described hereinbelow with reference to the drawings.

Figure 2:
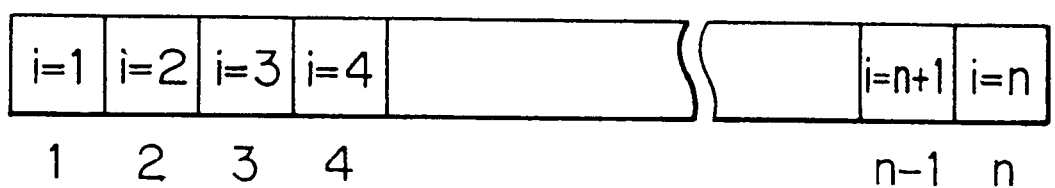
FIG. 2 is a diagram showing a block selecting method of an x-block fixed length encoding which is executed in a conventional image processing apparatus.
Figure 4:
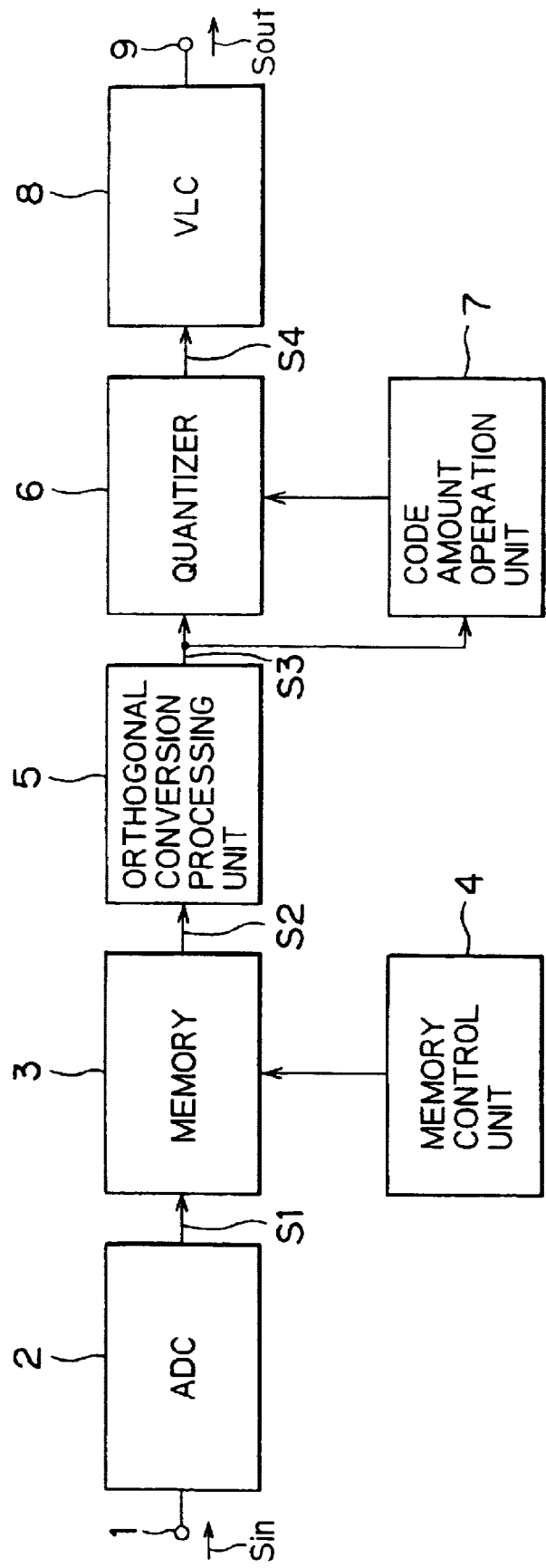
FIG. 4 is a constructional diagram showing an image processing apparatus according to an embodiment of the present invention.

FIG. 4 is a constructional diagram of an image processing apparatus showing an embodiment of the invention. In FIG. 4, reference numeral 1 denotes an input terminal to transfer an analog input image signal Sin which is supplied from the outside to the inside of the apparatus.

The analog input image signal Sin which was transmitted to the inside through the input terminal 1 is first sent to an A/D converter 2 and is converted into a digital image signal S1.

The digital image signal S1 is sent to a memory circuit 3 and is accumulated therein. Addresses and the writing and reading-out operations of the memory circuit 3 are controlled by a memory control unit 4.

Image data S2 which was read out from the memory circuit 3 on the basis of the read-out control by the memory control unit 4 is subsequently given to an orthogonal conversion processing unit 5 and is orthogonal converted. Orthogonal converted image data S3 is given to a quantizer 6 and is quantized by using an arbitrary quantization table. Quantized image data S4 is now supplied to a variable length encoding circuit (VLC) 8 and is variable length encoded.

The orthogonal converted image data S3 is also supplied to a code amount operation unit 7. A quantization table such as to obtain a code amount in a certain range in the case where the image data was quantized and variable length encoded on a unit basis of x (x>1) blocks (hereinafter, referred to as an x-block fixed length encoding) is selected on the basis of the value calculated by the code amount operation unit 7.

The image data S4 which was quantized by using a predetermined quantization table as mentioned above is subsequently supplied to the VLC 8 and is variable length encoded. The variable length encoded image data is generated as an output image signal Sout of the image processing apparatus.

Figures 1A, 1B:
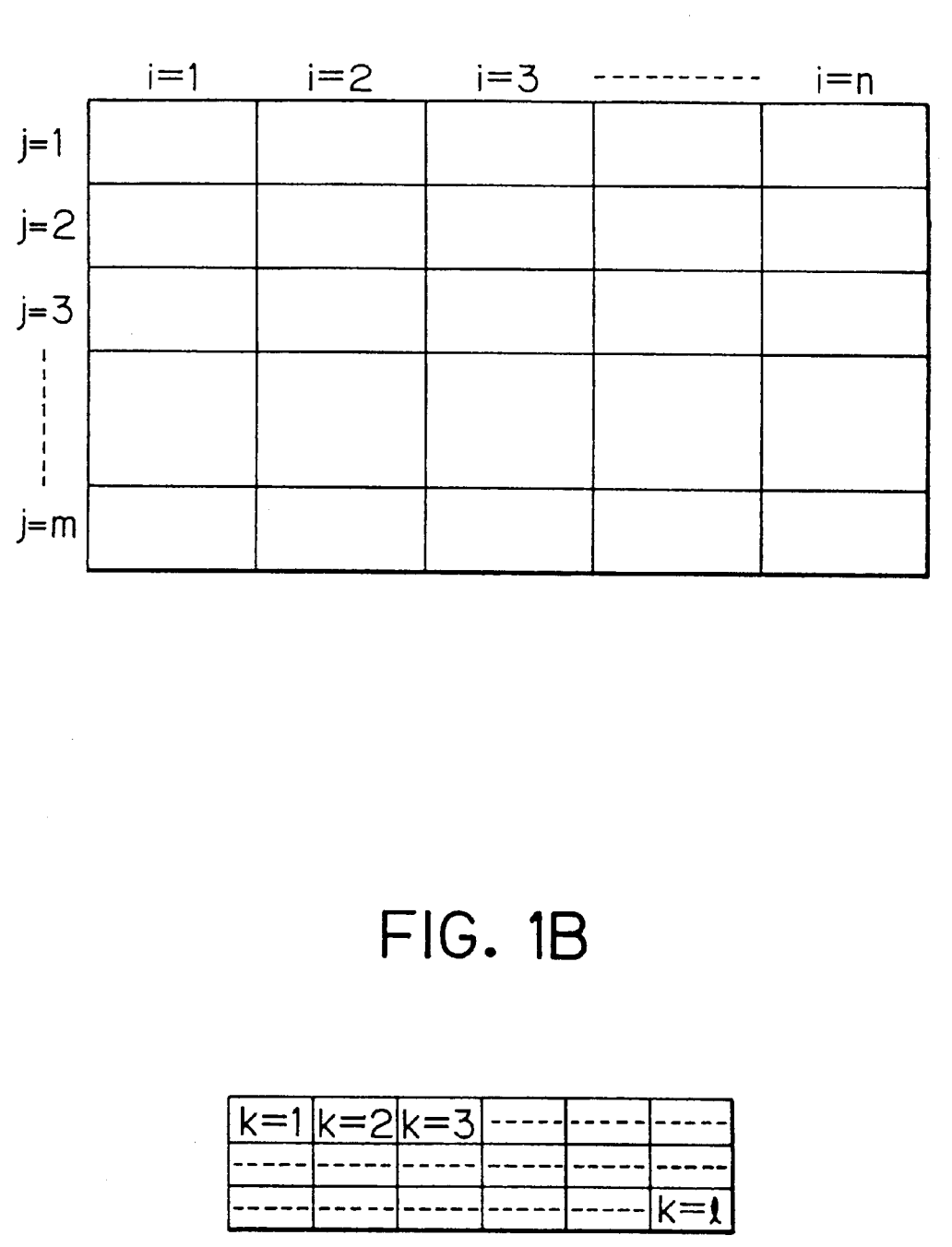

In the image processing apparatus of the embodiment constructed as mentioned above, the division of the block which is orthogonal converted and the selection of the block which is x-block fixed length encoded are executed by the memory control unit 4 as mentioned above. Since the orthogonal conversion is substantially the same as the operation which has already been described with reference to FIGS. 1A and 1B, its detailed description is omitted in the explanation of the image processing apparatus of FIG. 4.

Figure 5A:
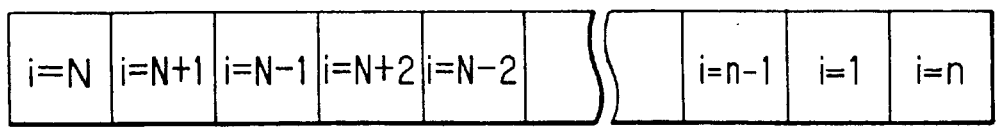
FIGS. 5A and 5B are diagrams showing a block selecting method of an x-block fixed length encoding which is executed in the image processing apparatus of FIG. 4.
Figure 5B:
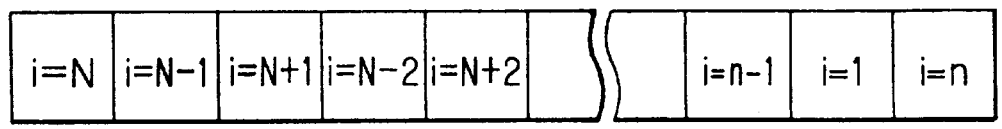

FIG. 5A shows a block selecting method in the case where the value of (n) in (i=1 to n) in FIG. 1 is equal to an even number. FIG. 5B shows a block selecting method in the case where (n) is equal to an odd number.

As will be obviously understood from FIGS. 5A and 5B, in the embodiment, in both of FIGS. 5A and 5B, the block is selected from the center of the screen and the block is gradually selected toward both sides of the screen.

By selecting the blocks as mentioned above, the position of the block which is selected at the Xth order of the x-block fixed length encoding approaches the periphery of the screen with an increase in value of (X). Therefore, when an error occurs before decoding, since the number of errors which occur gradually increases as the position approaches the periphery of the image, the errors can be made visually inconspicuous. A deterioration of the picture quality due to the occurrence of errors can be minimized.

According to the embodiment as mentioned above, when a plurality of blocks are selected in order to perform the fixed length encoding, it is set so that the position of the block that is selected at the nth order approaches the periphery of the screen with an increase in value of (n). Therefore, when errors occur before decoding, the number of errors can be made gradually increase as the position approaches the periphery of the image and the errors can be made visually inconspicuous.

FIG. 6 shows another embodiment of a selecting method of the block for the x-block fixed length encoding which is executed by the memory control unit 4 in the image processing apparatus of the invention shown in FIG. 4 and will be explained hereinbelow.

In FIG. 6, t=1, t=2, t=3, . . . indicate a time elapse for execution of the x-block fixed length encoding.

In this case, at time t=1, the value of (i) is sequentially progressed to (i=1 to i=n) in a manner similar to the conventional apparatus. At time t=2, however, the value of (i) is sequentially progressed to (i=2 to i, i=1). At time t=3, the value of (i) is progressed to (i=3 to i=n, i=1, i=2). It is now assumed that the values of (j, k) are the same as those in the conventional apparatus.

In the image processing apparatus of the embodiment as mentioned above, since the block which is x-block fixed length encoded is selected while rotating the block in which the selection is started, even if an error occurs in the Xth block in the x blocks, an inconvenience such that the occurring position of the error has a correlation for the horizontal direction can be prevented.

Due to this, it is possible to construct such that the errors are concentrated to the same location and an inconvenience such that the images after the Xth block cannot be decoded because of the occurrence of the error in the Xth block can be eliminated.

According to the above embodiment, when the block to be subjected to the fixed length encoding is selected, the position of the block that is selected at the nth order doesn't have any correlation in the vertical and horizontal directions of the image in each of a plurality of blocks. Therefore, in the case where the error occurs before decoding, it is possible to construct such that a probability of the occurrence of the error doesn't depend on the position of the image. Consequently, the deterioration of the picture quality due to the occurrence of the error can be made visually inconspicuous.

Figures 8, 9:
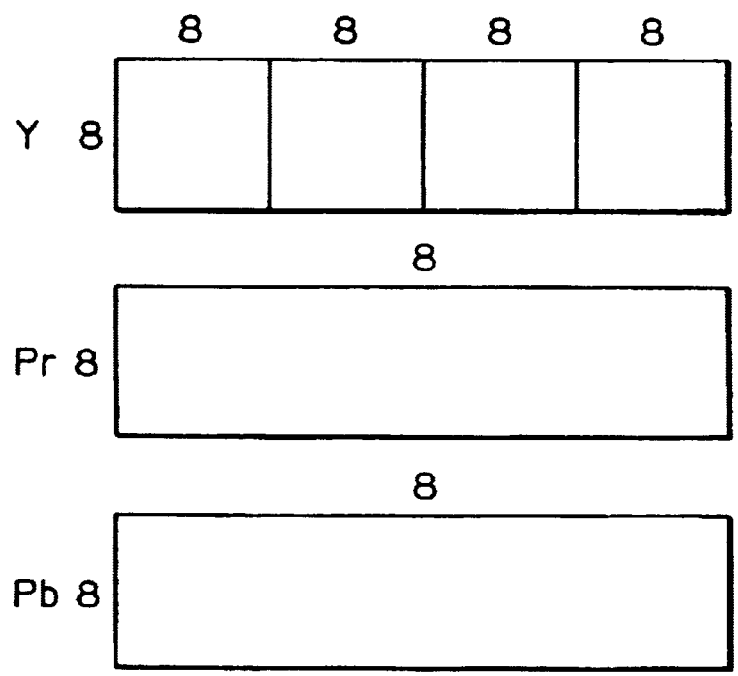
FIG. 8 is a diagram showing a construction in the divided block.
FIG. 9 is a diagram showing constructions of reference blocks.

FIG. 7 shows a situation of the block formation such that one image in FIG. 4 is divided into, for example, five blocks in the horizontal direction and ten blocks in the vertical direction. Each of An, Bn, Cn, Dn, and En (n is an integer of 1 to 10) denotes a divided block. Each of the divided blocks is further divided into, for instance, 30 reference blocks as shown in FIG. 8. When considering the case, as an example, where sampling ratios of a luminance signal Y and color difference signals $P_b$ and $P_r$ are equal to 4:1:1 as shown in FIG. 9, the reference blocks comprises total six blocks [each comprising (8 pixels)×(8 pixels)] [generally, (N pixels)×(M pixels)] of four blocks with respect to the Y signal and one block for the $P_r$ signal and one block for the $P_b$ signal.

A plurality of reference blocks which are constructed as mentioned above are collected on one picture screen, thereby constructing a fixed length encoding block. An efficient variable length encoding is executed in the fixed length encoding block in order to fix a code amount.

Figure 10:
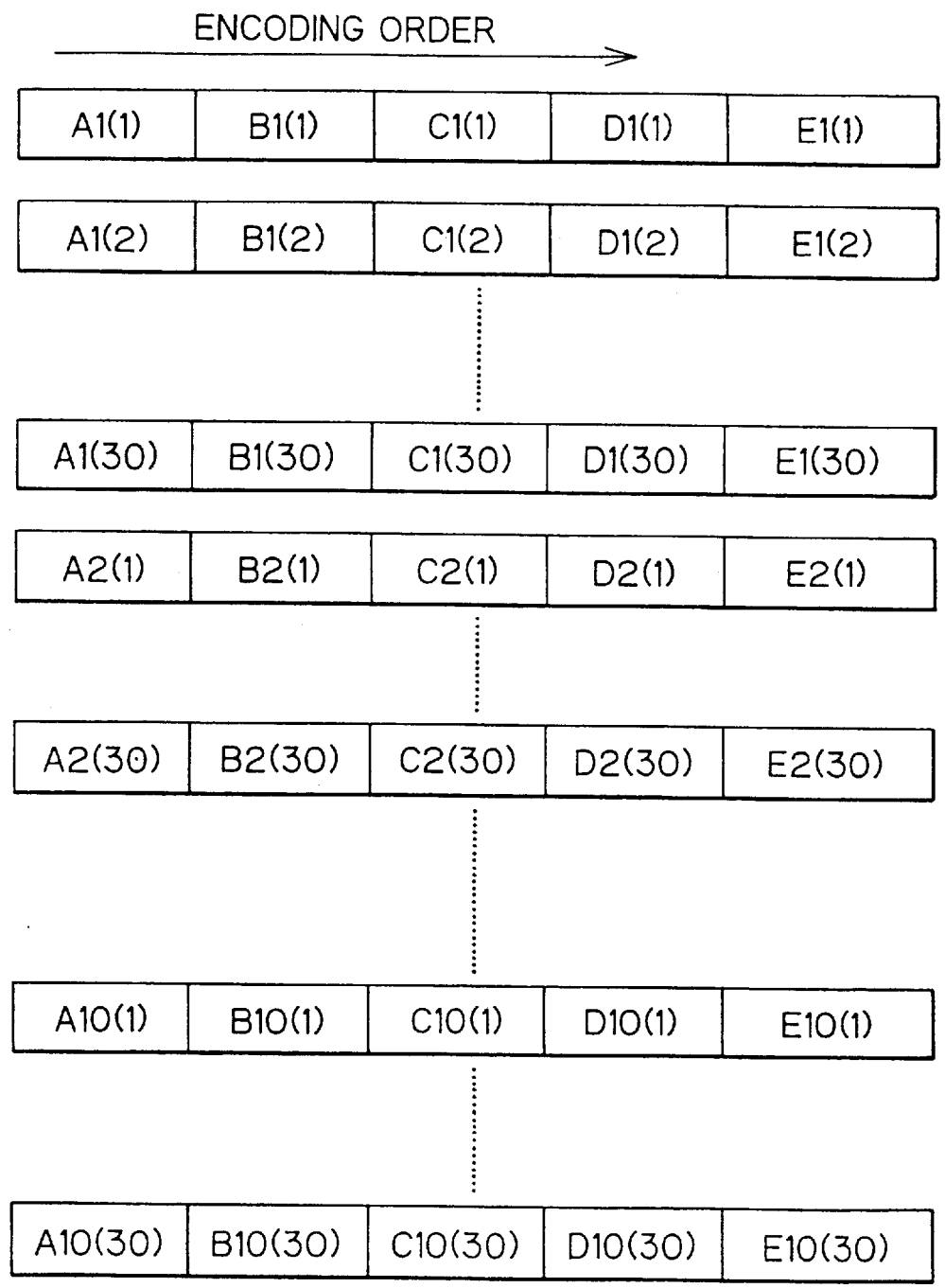
FIG. 10 is a diagram showing a construction of a conventional fixed length encoding section.

A method of fixed length encoding at that time will now be described with reference to FIGS. 10 and 7. As shown in FIG. 10, it is now assumed that a fixed length encoding block is constructed by, for example, five reference blocks. The reference blocks in the divided blocks An, Bn, Cn, Dn, and En are expressed by An(i), Bn(i), Cn(i), Dn(i), and En(i), respectively. (i) denotes an integer of 1 to 30.

In the conventional apparatus, first, one reference block is extracted from the five divided blocks in accordance with the order of An, Bn, Cn, and Dn as shown in FIG. 7. In this instance, the extracting order of the reference blocks from the regions A, B, C, D, and E has already been shuffled so that the distance between the reference blocks on the screen becomes far. The reference blocks in each of the fixed length encoding blocks which were extracted as mentioned above are variable length encoded in accordance with the order shown by an arrow in FIG. 10.

Figure 11:
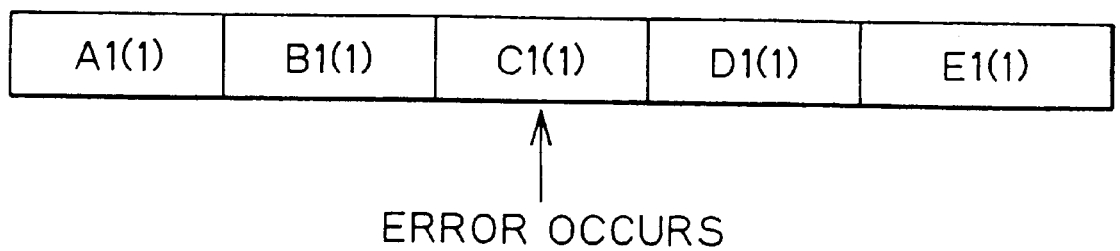
FIG. 11 is an explanatory diagram of an error which occurs in a fixed length encoding block.

According to the extracting method of the reference blocks by the fixed rule as mentioned above, however, as shown in FIG. 11, when an error occurs at a certain position in the fixed length encoding block, the reference blocks after the error occurring position cannot correctly been decoded upon reproduction. This means that the deterioration of the picture quality is concentrated in the right side portion on the screen in terms of a probability.

Another embodiment, therefore, is characterized by comprising: block forming means for dividing an image signal into a plurality of blocks; orthogonal converting means for orthogonal converting image data of each block; and variable length encoding means for variable length encoding the conversion data which was converted by the orthogonal converting means in accordance with a priority of each block so as to substantially obtain a target code amount in a predetermined number of blocks. The deterioration of the picture quality when an error occurs can be distributed on the screen by the above means. The picture quality deterioration at the time of occurrence of an error can be distributed to the corner on the screen and a relatively good picture quality can be maintained at the center of the screen in accordance with the proper selection of the priority.

Such an embodiment will now be described hereinbelow in detail with reference to the drawings.

Figure 12:
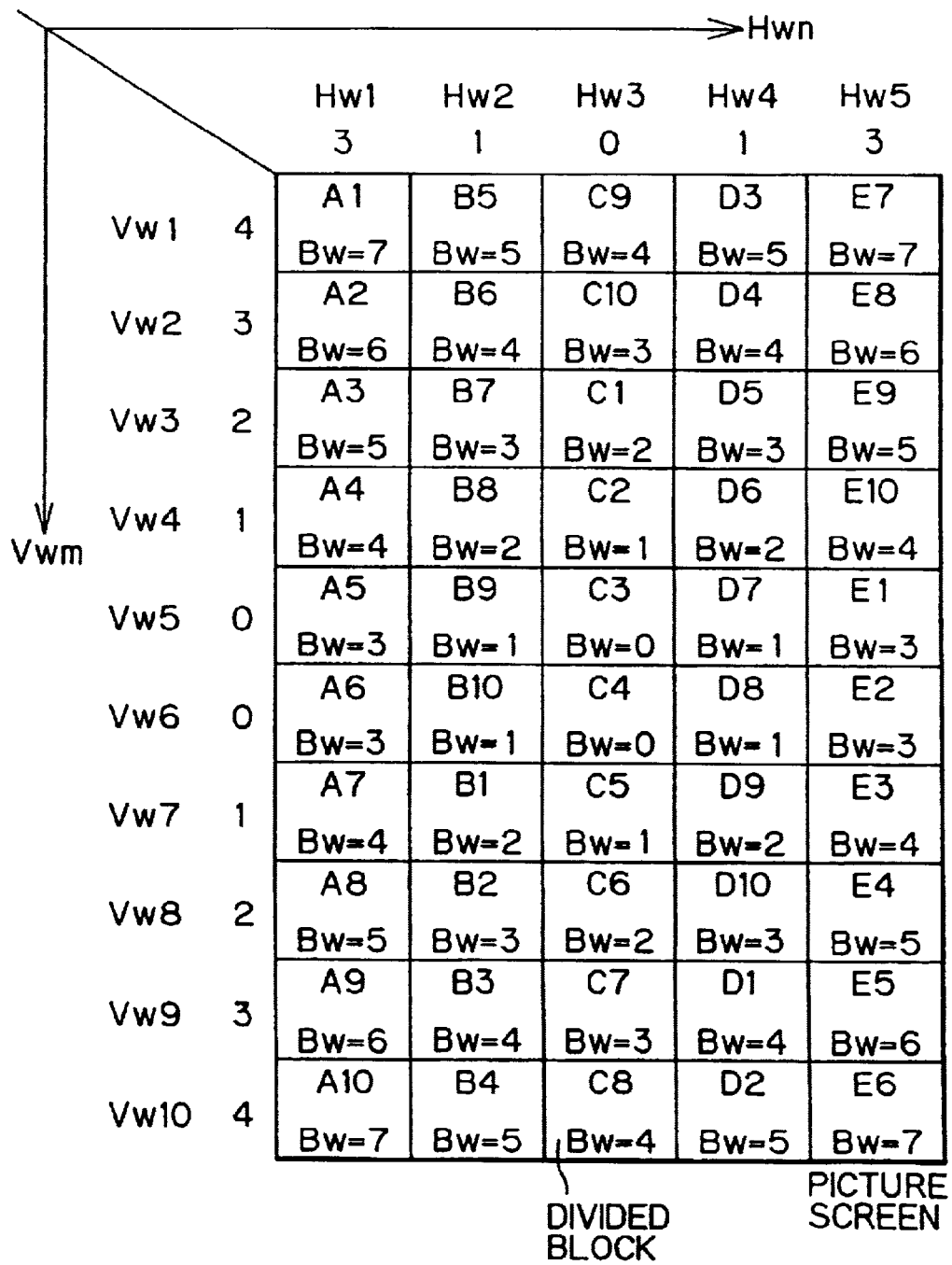
FIG. 12 is an explanatory diagram of priorities of the reference block extraction in an embodiment of the invention.

The extracting order of the reference blocks from the fixed length encoding block in the embodiment will now be described with reference to FIG. 12. In FIG. 12, Hwn (n is an integer of 1 to 5) denotes weighting coefficients which were set in the horizontal direction for the divided block. Similarly, Vwm (m is an integer of 1 to 10) denotes weighting coefficients which were set in the vertical direction for the divided blocks. Bw denotes a priority of each divided block.

One reference block is extracted from each of the regions of A, B, C, D, and E. A fixed length encoding block is constructed in accordance with the priority of the divided block to which the reference block belongs. The priority Bw is decided by the following equation. Namely, $$Bw = Hwn + Vwm$$

Figure 13:
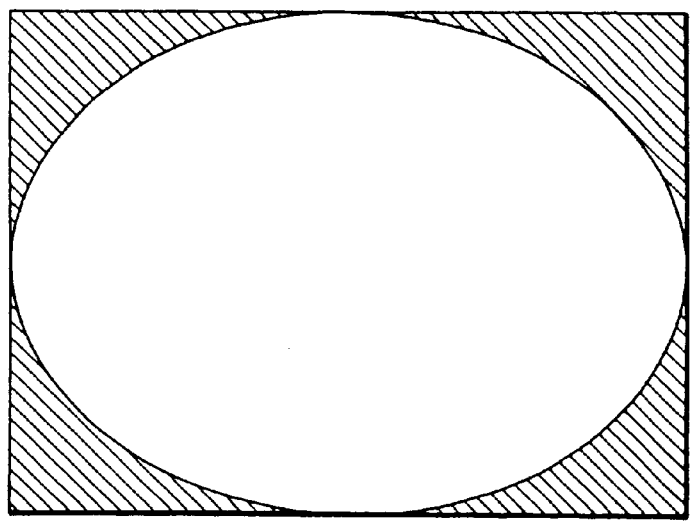
FIG. 13 is a diagram showing a distribution of a high priority on a picture screen according to the embodiment.

FIG. 13 is a schematic diagram showing a distribution of the priority in one picture screen which is determined as mentioned above. A blank portion in FIG. 12 has a relatively high priority and a hatched portion has a relatively low priority.

Figure 14:
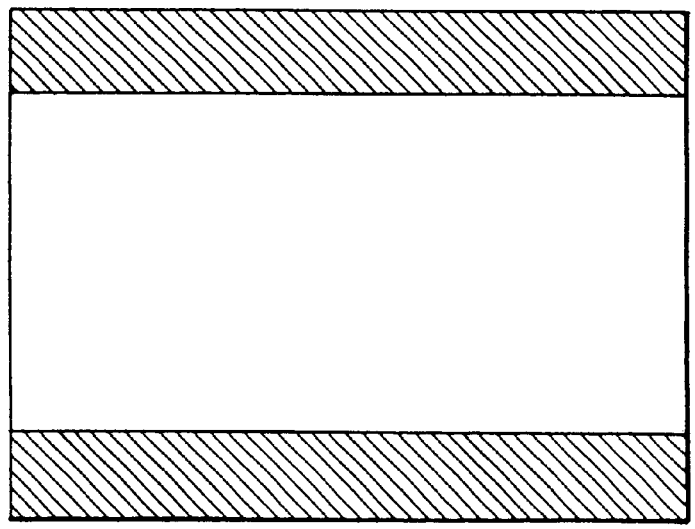
FIG. 14 is a diagram for explaining the selecting order when the priorities are equal.

Explanation will now be specifically made. In FIG. 12, a case of extracting the reference block from each of the divided blocks of A1, B1, C1, D1, and E1 will now be considered. The priorities Bw of the extracted reference blocks are set to 7, 2, 2, 4, and 3, respectively. The reference blocks are arranged from each divided block in accordance with the order of a small value of Bw, thereby constructing a fixed length encoding block. In this case, the priorities Bw of both of B1 and C1 are set to 2 and are equal. Such a state can also occur in another case. However, as shown in FIG. 14, in general, the reference block from the divided block which is close to the center when it is seen in the vertical direction of the screen is preferentially selected. Therefore, as shown in FIG. 15, the five reference blocks are arranged in accordance with the order of B1($n$), C1($n$), E1($n$), D1($n$), and A1($n$) in the fixed length encoding block. Another fixed length encoding block is also similarly constructed.

Figure 16:
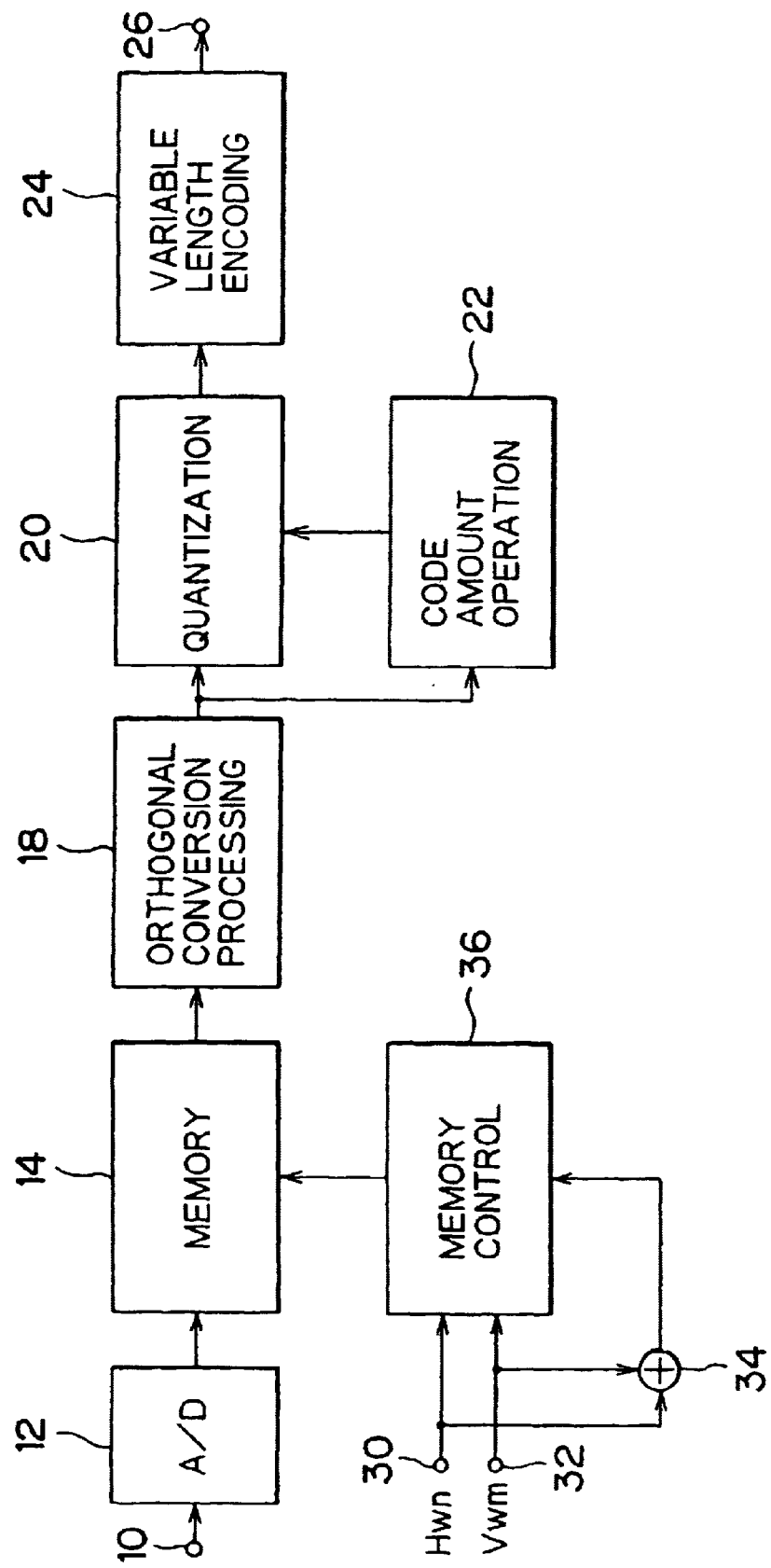
FIG. 16 is a schematic constructional diagram of the embodiment.

FIG. 16 shows a schematic constructional block diagram of the embodiment. The same component elements as those in the conventional apparatus are designated by the same reference numerals. Reference numeral 30 denotes an input terminal of the weighting coefficients Hwn of the divided block for the horizontal direction of the image; 32 an input terminal of the weighting coefficients Vwm of the divided block for the vertical direction of the screen; 34 an adder for adding the coefficients Hwn and Vwm from the input terminals 30 and 32; and 36 a memory control circuit for controlling the writing and reading-out operations of a memory 14 in accordance with the coefficients Hwn and Vwm from the input terminals 30 and 32 and an output of the adder 34.

The memory control circuit 36 reads out the reference blocks from each divided block from the memory 14 in accordance with the above inputs in a manner described with reference to FIG. 12. The subsequent processes are substantially the same as those in the conventional apparatus.

The dividing method of the picture screen, the constructing method of the divided blocks and reference blocks, and further the setting method of the weighting coefficients in the horizontal and vertical directions of the screen in the above embodiment have been shown and described as an example. It will be obviously understood that other methods can be used. For example, a method whereby the reference block near the central portion of the screen is first read out and a fixed length encoding block is constructed in accordance with the reference blocks which were read out is incorporated in the technical purview of the present invention.

In the embodiment, although the memory 14 and the memory control circuit 36 have been used, it is also possible to construct in a manner such that, in FIG. 16, the construction up to an orthogonal conversion processing circuit 18 is set to the same construction as that in the conventional apparatus, the weighting coefficients in the horizontal direction, the weighting coefficients in the vertical direction, and their sums are input to a code amount operation circuit 22, and the encoding order is rearranged in the operation circuit 22. It will be obviously understood that similar operation and effects can be also obtained by using such a construction.

As will be easily understood from the above description, according to the embodiment, even if an error occurs in the code data due to some reasons, the picture quality deterioration due to the error propagation can be distributed to the corner of the screen at a high probability. Due to this, a good stable reproduction image according to the human eyesight characteristics can be obtained.

Another embodiment will now be described.

The above embodiment intends to prevent the picture quality deterioration at a special position on the screen by devising the reading order of the data to be encoded from the memory. However, according to the following embodiment, by devising the recording order when the encoded data is recorded to a recording medium such as a magnetic tape or the like, the picture quality deterioration due to a head clog or the like can be reduced.

That is, the embodiment is made in order to make it possible to minimize an unnatural image which is caused by a head clog. According to the invention, there is provided a recording and reproducing system in which a first block is constructed by a plurality of pixels in one frame, a second block is constructed by collecting a plurality of first blocks, data of one channel is further constructed by collecting a plurality of second blocks, and the data is recorded or reproduced by a plurality of channels, wherein the second blocks which are adjacent in the vertical and horizontal directions in the same frame are recorded by other channels, the channel to record the image signal of the second block at the same position is changed on a frame unit basis, and in the case where an undecodable second block occurs upon reproduction, the data of the undecodable second block is substituted by using the reproduction image data of the second block of the previous frame.

According to the recording and reproducing system of the embodiment, by constructing such that an interpolation unit is distributed and interpolated as a minimum unit at which a luminance signal and color difference signals coincide, even if an uncorrectable code error occurs, image data can be interpolated on a macro block unit basis in a checkerwise manner by using the image data of the previous frame, and a reproduction image of a small unnaturality in terms of the eyesight can be obtained.

FIG. 17 is a block diagram showing a schematic construction of an image transmitting and receiving system of a digital VTR according to the embodiment. For example, it is now assumed that the image signal is an NTSC component signal and ratios of sampling frequencies of the luminance signal Y and the color difference signals $P_B$ and $P_r$ is set to 4:1:1 and the number of effective pixels is set to (720×480) for the luminance signal Y and to (180×480) for both of the color difference signals $P_B$ and $P_r$.

An example of a conventional recording and reproducing system will now be described hereinbelow with reference to FIG. 17.

In the conventional digital VTR of the recording and reproducing system, an image signal per frame is written into ten tracks on a magnetic recording tape by using a discrete cosine transformation (hereinafter, referred to as a DCT). Recording and reproducing heads which are used when writing the image data are set to two channels so as to face each other at an angle of 180°.

The operation of FIG. 17 will now be described.

The luminance signal Y and color difference signals $P_B$ and $P_r$ are first input to input terminals 201, 202, and 203, respectively. Those signals are A/D converted by A/D converters 204, 205, and 206 at the sampling frequency of 13.5 MHz for the luminance signal Y and at the sampling frequency of 3.375 MHz for the color difference signals $P_B$ and $P_r$, respectively.

The digital signals formed as mentioned above are sequentially written into frame memories 208 and 209 in a raster scanning state as they are in accordance with writing addresses which are generated by a writing address generator 210. In this instance, the frame memories 208 and 209 to write those signals are switched every frame by a writing change-over switch 207.

A read-out change-over switch 212 selects the frame memory opposite to the frame memory into which the digital signals are written. The digital signals written are read out in accordance with the writing addresses which are generated by a read-out address generator 211.

Figure 18A:
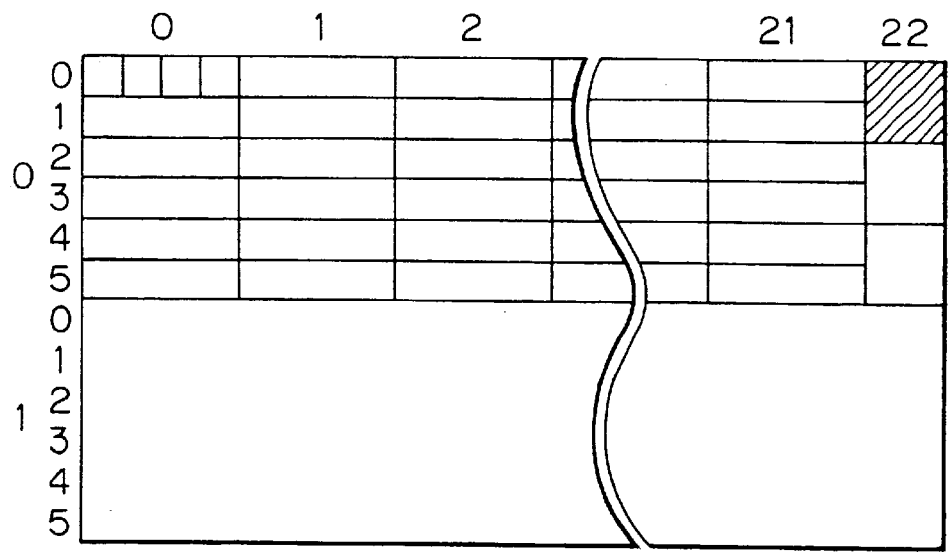
FIG. 18A is a diagram showing a constructing method of a block of a luminance signal Y.
Figure 18B:
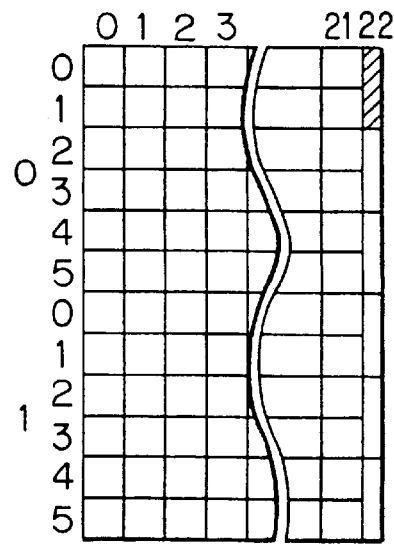
FIG. 18B is a diagram showing a constructing method of a block of a color difference signal.

FIGS. 18A and 18B are diagrams showing picture planes which are recorded by two tracks and are shown to explain a block formation. FIG. 18A shows the luminance signal Y. FIG. 18B shows the color difference signals $P_B$ and $P_r$. When the written digital signals are read out from the frame memory, they are first read out on a DCT block unit basis of (8×8) pixels.

As mentioned above, since the ratios of the sampling frequencies of the luminance signal Y and the color difference signals $P_B$ and $P_r$ are set to 4:1:1, one macro block is constructed by total six DCT blocks of 4 DCT blocks of the luminance signal Y and one DCT block of each of the color difference signals $P_B$ and $P_r$ corresponding to the luminance signal Y. The data in the frame memory is read out on such a macro block unit basis.

In FIG. 18A, those four DCT blocks of the luminance signal Y comprise (32×8) pixels. Addresses of the 4 DCT blocks are set to [the numbers (0 to 5) in the vertical direction]–[the numbers (0 to 22) in the horizontal direction] and explanation will now be made hereinbelow.

When observing the four DCT blocks in a manner such as 0-1, 0-2, 0-3, . . . , the address of 0-22 comprises (16×8) pixels and there are only two blocks. Therefore, the (16×8) pixels in the address 1-22 under the address 0-22 are added, thereby forming four DCT blocks of (16×16) pixels.

In FIG. 18B, one DCT block of each of the color difference signals $P_B$ and $P_r$ comprises (8×8) pixels. Addresses of one DCT block are set to [the numbers (0 to 5) in the vertical direction]–[the numbers (0 to 22) in the horizontal direction] in a manner similar to the case of the luminance signal Y. In this instance, since the address 0-22 comprises (4×8) pixels, the (4×8) pixels in the address 1-22 are added, thereby forming one DCT block of (4×16) pixels. The addresses of the luminance signal Y and the color difference signals $P_B$ and $P_r$ are set to the addresses of the macro block since those signals are the image signal at the same position.

The image signal of one track is constructed by (720×48) pixels of the luminance signal Y in FIG. 18A, namely, 90×6 DCT blocks and two (180×48) of the color difference signals $P_B$ and $P_r$ in FIG. 18B, namely, 22.5×6 DCT blocks. The image signals of ten tracks form the image signal of one frame.

Figure 19:
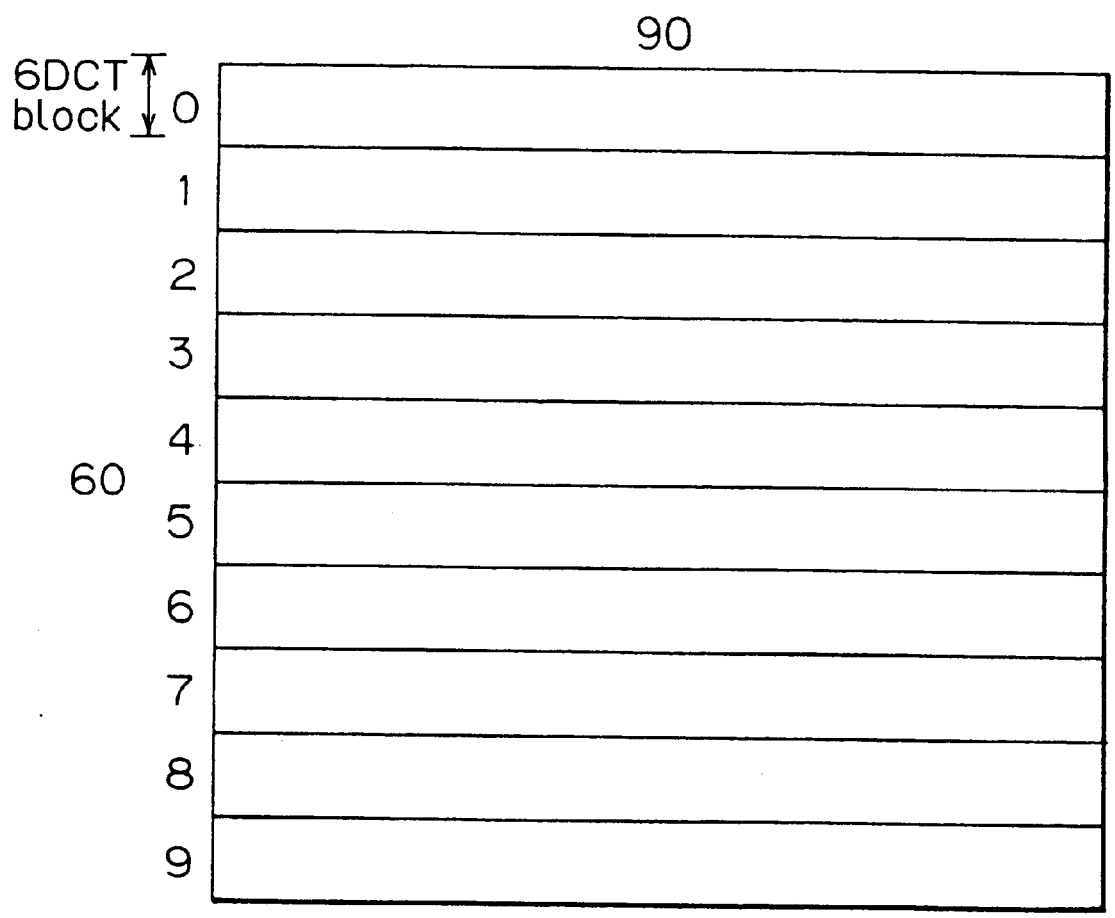
FIG. 19 is a diagram showing a picture screen of one frame.

FIG. 19 is a diagram showing a picture screen of one frame. To divide the image signal of one frame into ten portions and to record onto recording tracks, one frame is divided into ten portions and the numbers of 0, 1, ..., 9 are sequentially added to the divided ten portions of one frame from the upper portion, and those ten portions are set to the image signals of the zeroth track, the first track, ..., and the ninth track.

Figure 20:
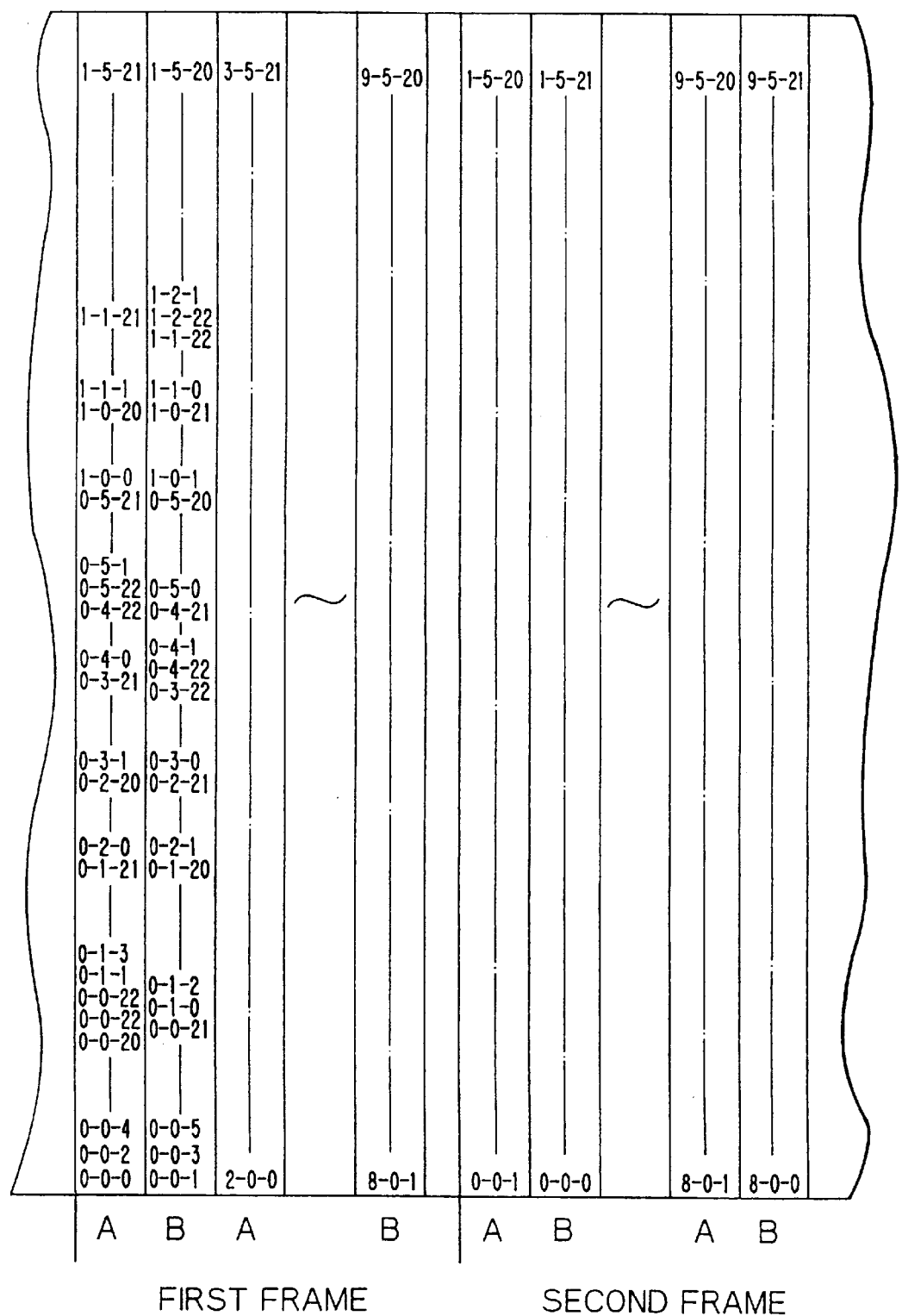
FIG. 20 is a diagram showing a tape format to which the invention is embodied.

The addresses on the tape in FIG. 20 relate to the image signals of one macro block unit. Those addresses are expressed by adding the track numbers to the positions before the addresses of the macro block. Each address is shown as (the track number)–(the vertical address of the macro block)–(the horizontal address of the macro block).

In FIG. 17, the signal which was generated from the change-over switch 212 and was divided as a macro block is compressed by a high efficiency encoding circuit 213. A parity is added to the compressed signal by an error correction encoding circuit 214, so that the compressed signal is set to an encoding block of, for example, a Reed Solomon double product code.

A sync signal and the like are added to the encoded signal by a formatter 215 and is output as track format data. The track format data which was output is supplied from a recording amplifier 216 to heads 217.

Figure 21:
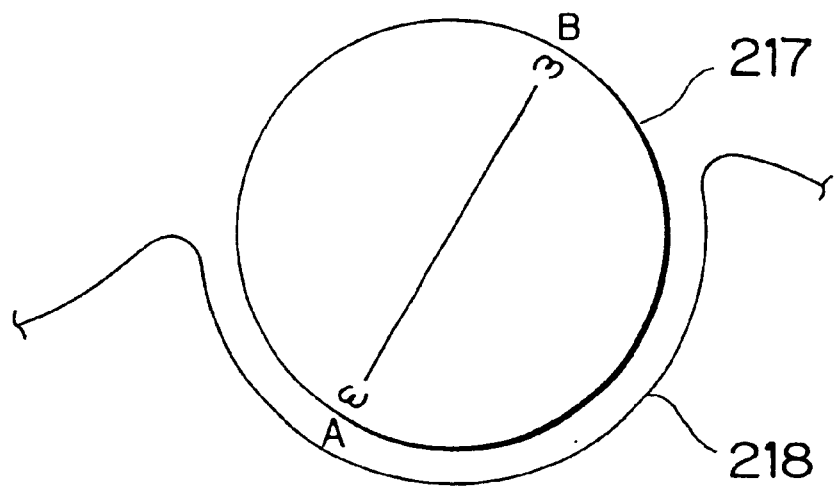
FIG. 21 is a diagram showing a head arrangement.

The heads 217 are provided for two channels and are arranged at opposite positions so as to face each other at an angle of 180° as mentioned above. FIG. 21 is a diagram showing a construction of the head. In FIG. 21, one of the heads 217 is set to the A channel and the other is set to the B channel.

The track format data is sequentially recorded by the heads 217 onto a magnetic recording tape 218 in accordance with the order shown in FIG. 20.

In FIG. 17, the data recorded on the magnetic recording tape 218 as shown in FIG. 20 is read out by the heads 217 upon reproduction. The read-out track format data passes through a reproducing amplifier 219 and the sync signal is detected by a deformatter 220 and the signal is returned to the signal of the encoded block.

The signal is supplied to an error correction decoding circuit 221 and errors which occurred upon recording and reproduction are detected and corrected.

The signal after completion of the error detection and correction is expanded by a high efficiency decoding circuit 222 and is returned to the macro block formed image signal. In the image signal, an error flag is set for the errors exceeding the correcting ability of the error correction decoding circuit 221. Those uncorrectable errors are interpolated by replacing to the data of the track at the same position of the previous frame by an interpolation circuit 223.

For example, in the case where a head clog occurs in either one of the A and B channels of the heads 217 due to a choking or the like, the data of the track at the same position of the previous frame is the data which was recorded by another recording channel different from the recording channel at which the head clog occurred. Therefore, such data is interpolated by the data of the track at the same position of the previous frame.

FIGS. 22A and 22B show display picture screens corresponding to recording areas of two tracks and show recording channels of the macro block unit.

In FIG. 17, the luminance signal Y and the color difference signals $P_B$ and $P_r$ in the image signal whose errors were interpolated are D/A converted by D/A converters 224, 225, and 226, respectively. After that, the luminance signal Y is supplied to an output terminal 227, the color difference signal $P_B$ is supplied to an output terminal 228, and the color difference signal $P_r$ is supplied to an output terminal 229, respectively.

FIGS. 22A and 22B are picture screen image diagrams of two tracks of the recording and reproducing system of the invention. First, the image signals written as A are read out to thereby construct one track and the signals written as B are subsequently read out so as to form a checkerwise pattern, which will be explained in detail hereinlater.

In FIG. 17, the macro block formed signal which was output from the change-over switch 212 is compressed by the high efficiency encoding circuit 213. A parity is added to the compressed signal by the error correction encoding circuit 214, so that the signal is set to an encoding block of, for example, a Reed Solomon double product code.

A sync signal and the like are added to the encoded signal by the formatter 215 and is output as track data. The track data is supplied from the recording amplifier 216 to the heads 217. The heads are set to two channels and are arranged at opposite positions so as to face each other at an angle of 180° as mentioned above.

In FIG. 20, the addresses on the tape are set on a macro block unit basis as mentioned above. The recording channels are switched every track and the signals are recorded. In case of recording the next frame, the image signals of the macro block at the same position as that of the previous frame are set to the different recording channels A and B.

As shown in FIG. 20, the data recorded on the magnetic recording tape 218 in FIG. 17 as shown in FIG. 20 is read out by the heads 217 upon reproduction. The read-out track format data passes through the reproducing amplifier 219 and the sync signal is detected by the deformatter 220 and the signal is returned to the signal of the encoded block. The errors which occurred upon recording and reproduction in the signal are detected and corrected by the error correction decoding circuit 221.

Subsequently, the signal whose errors were detected and corrected is expanded by the high efficiency decoding circuit 222 and is returned to the macro block formed image signal. In the image signal, an error flag is set to the errors exceeding the correcting ability by the error correction decoding circuit 221. Those uncorrectable errors are interpolated by replacing to the data of the track at the same position of the previous frame by the interpolation circuit 223.

For example, in the case where a head clog occurs in either one of the A and B channels of the heads 217 due to a choking or the like, since the data of the macro block at the same position of the previous frame is the data which was recorded by another recording channel different from the recording channel in which the head clog occurred, such data is interpolated by using the macro block data at the same position of the previous frame.

FIGS. 22A and 22B show display picture screens corresponding to the recording areas of two tracks and show the recording channels of the macro block unit. FIGS. 22A and 22B alternately occur every frame. FIGS. 22A and 22B have a form corresponding to FIG. 18A and A and B denote that the signals were recorded by the A and B channels, respectively.

By constructing the two recording channels so as to have a checkerwise pattern each other, when a head clog occurs, the erroneous data can be interpolated by the data of the macro block at the same position of the previous frame. An image without unnaturality can be reproduced by such an interpolation.

In FIG. 17, the luminance signal Y and the color difference signals $P_B$ and $P_r$ of the image whose errors were interpolated are D/A converted by the D/A converters 224, 225, and 226, respectively. After that, the luminance signal Y is output to the output terminal 227, the color difference signal $P_B$ is output to the output terminal 228, and the color difference signal $P_r$ is output to the output terminal 229, respectively.

According to the embodiment as mentioned above, even in the case where a head clog occurs in either one of the heads of the A and B channels due to a choking or the like, such erroneous data can be interpolated on a macro block unit basis in a checkerwise manner and is distributed and interpolated by relatively small blocks. Therefore, a reproduction image in which an unnaturality is visually small can be provided.

What is claimed is:

1. An image processing apparatus, comprising:

a memory, arranged to store image data, wherein the image data comprises luminance data and color data;

a read-out unit, arranged to divide the image data stored in said memory into a plurality of large blocks, divide each of the plurality of large blocks into a plurality of reference blocks, and read out the stored image data on a unit basis of a reference block, each reference block being formed with m blocks of the luminance data and n blocks of the color data spatially corresponding to the m blocks of the luminance data, wherein said read-out unit reads out one reference block from each of N large blocks such that read-out positions of N reference blocks are not correlated with each other in a horizontal direction and/or a vertical direction; and an encoder, arranged to encode sequentially the image data of the reference blocks read out by said read-out unit, said encoder adjusting a code amount on an N reference block basis, wherein m and n are natural numbers, and N is a positive integer greater than two.

2. An apparatus according to claim 1, wherein said encoder includes an orthogonal transformer, a quantizer and a variable length encoder.

3. An apparatus according to claim 2, further comprising a rate controller for controlling said quantizer according to data that has been orthogonally-transformed by said orthogonal transformer.

4. An apparatus according to claim 1, wherein a ratio of the number of pixel blocks of luminance data and the number of pixel blocks of color data, both of which blocks are used to form each reference block, corresponds to a sampling ratio of the luminance data and the color data.

5. An apparatus according to claim 1, wherein said encoder includes a controller for controlling a code amount so that an amount of encoded data of the n reference blocks falls within a predetermined code amount.

6. An apparatus according to claim 1, further comprising a recorder, arranged to record the image data encoded by said encoder, on a recording medium.

7. An image processing method, comprising the steps of:

storing image data, wherein the image data comprises luminance data and color data;

diving the image data stored in the storing step into a plurality of large blocks, dividing each of the plurality of large blocks into a plurality of reference blocks, and reading out the stored image data on a unit basis of a reference block, each reference block being formed with m blocks of the luminance data and n blocks of the color data spatially corresponding to the m blocks of the luminance data, wherein the dividing and reading out step reads out one reference block from each of N large blocks such that read-out positions of N reference blocks are not correlated with each other in a horizontal direction and/or a vertical direction; and encoding sequentially the image data of the reference blocks read out in the dividing and reading out step, the encoding step including a step of adjusting a code amount on an N reference block basis, wherein m and n are natural numbers, and N is a positive integer greater than two.

* * * * *

UNITED STATES PATENT AND TRADEMARK OFFICE
CERTIFICATE OF CORRECTION

PATENT NO. : 6,731,816 B2
DATED : May 4, 2004
INVENTOR(S) : Shingo Ikeda et al.

It is certified that error appears in the above-identified patent and that said Letters Patent is hereby corrected as shown below:

Column 1,
Line 33, "is" should read -- are --.

Column 4,
Line 48, "made" should read -- made to --.

Column 5,
Line 62, "been" should read -- be --.

Column 11,
Line 17, "An image without unnaturality" should read -- A more natural image --; and
Line 33, "unnaturality" should read -- imperfection --.

Column 12,
Line 6, "integer" should read -- integer equal to or --;
Line 31, "diving" should read -- dividing --; and
Line 48, "integer" should read -- integer equal to or --.

Signed and Sealed this

Fifth Day of July, 2005

JON W. DUDAS
*Director of the United States Patent and Trademark Office*